United States Patent
Kim et al.

(10) Patent No.: US 10,666,338 B2
(45) Date of Patent: May 26, 2020

(54) CHANNEL QUALITY MEASUREMENT METHOD IN MULTIPLE ANTENNA WIRELESS COMMUNICATION SYSTEM AND DEVICE FOR SAME

(71) Applicant: LG Electronics Inc., Seoul (KR)

(72) Inventors: Youngtae Kim, Seoul (KR); Hanjun Park, Seoul (KR); Jonghyun Park, Seoul (KR); Kijun Kim, Seoul (KR); Bonghoe Kim, Seoul (KR); Kunil Yum, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 223 days.

(21) Appl. No.: 15/309,019

(22) PCT Filed: May 29, 2015

(86) PCT No.: PCT/KR2015/005417
§ 371 (c)(1),
(2) Date: Nov. 4, 2016

(87) PCT Pub. No.: WO2015/183035
PCT Pub. Date: Dec. 3, 2015

(65) Prior Publication Data
US 2017/0111098 A1 Apr. 20, 2017

Related U.S. Application Data

(60) Provisional application No. 62/004,893, filed on May 30, 2014.

(51) Int. Cl.
*H04B 7/06* (2006.01)
*H04L 1/20* (2006.01)
(Continued)

(52) U.S. Cl.
CPC ......... *H04B 7/0632* (2013.01); *H04B 7/0486* (2013.01); *H04B 7/0626* (2013.01);
(Continued)

(58) Field of Classification Search
None
See application file for complete search history.

(56) References Cited

U.S. PATENT DOCUMENTS 9,674,742 B2 * 6/2017 Auer ................. H04W 72/0446
2011/0032839 A1 2/2011 Chen et al.
(Continued)

FOREIGN PATENT DOCUMENTS

| EP | 2562951 A1 | 2/2013 | |
|---|---|---|---|
| KR | 1020130036072 A | 4/2013 | |
| WO | WO-2012053858 A2 * | 4/2012 | ............. H04B 7/024 |

OTHER PUBLICATIONS

Huawei, HiSilicon, "Signaling for PDSCH RE mapping and quasi co-location in DCI format 2D", 3GPP TSG RAN WG1 Meeting #71 R1-124692, Nov. 12, 2012 (Year: 2012).*

*Primary Examiner* — Thinh D Tran
(74) *Attorney, Agent, or Firm* — Dentons US LLP

(57) ABSTRACT

The present invention relates to a method and device for measuring channel quality by a base station having a two-dimensional active antenna system including multiple antennas. Particularly, the method comprises: receiving channel state information (CSI) generated on the basis of a first reference signal relating to a part of multiple antennas, from a terminal; selecting a precoding and a rank based on a precoding matrix indicator (PMI) and a rank indicator (RI) of the received CSI; generating a port by applying the selected precoding and the selected rank; through the generated port, transmitting, to the terminal, a physical downlink shared channel (PDSCH) and a demodulation-reference signal (DM-RS) configured for the terminal; and receiving,
(Continued)

from the terminal, a channel quality indication (CQI) feedback for reducing a mismatch for the CQI of the CSI, wherein the CQI feedback may be generated based on the DM-RS.

2 Claims, 11 Drawing Sheets

(51) Int. Cl.
  *H04L 1/00* (2006.01)
  *H04B 7/0456* (2017.01)
  *H04B 7/01* (2006.01)

(52) U.S. Cl.
  CPC ......... *H04B 7/0639* (2013.01); *H04L 1/0026* (2013.01); *H04L 1/20* (2013.01); *H04B 7/01* (2013.01); *H04B 7/063* (2013.01); *H04B 7/068* (2013.01); *H04B 7/0669* (2013.01); *H04B 7/0671* (2013.01); *H04B 7/0691* (2013.01)

(56) References Cited

U.S. PATENT DOCUMENTS

| | | | |
|---|---|---|---|
| 2012/0076028 A1* | 3/2012 | Ko | H04L 1/0026 370/252 |
| 2012/0230290 A1* | 9/2012 | Seo | H04L 1/0026 370/329 |
| 2013/0223548 A1* | 8/2013 | Kang | H04B 7/024 375/260 |
| 2013/0322278 A1 | 12/2013 | Lee et al. | |
| 2014/0056156 A1 | 2/2014 | Jongren | |
| 2014/0105102 A1* | 4/2014 | Balraj | H04L 1/0026 370/328 |
| 2014/0119266 A1* | 5/2014 | Ng | H04L 1/0061 370/312 |
| 2014/0219255 A1* | 8/2014 | Eyuboglu | H04W 72/12 370/336 |
| 2015/0003311 A1* | 1/2015 | Feuersaenger | H04W 52/0225 370/311 |
| 2015/0016379 A1* | 1/2015 | Nam | H04B 7/0456 370/329 |
| 2016/0029401 A1* | 1/2016 | Fukuta | H04W 72/1205 370/329 |

* cited by examiner

FIG. 3
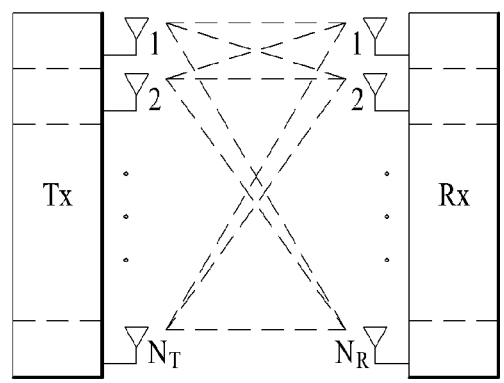
(a)
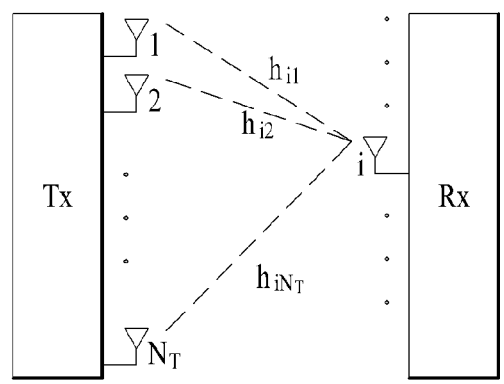
(b)

FIG. 4
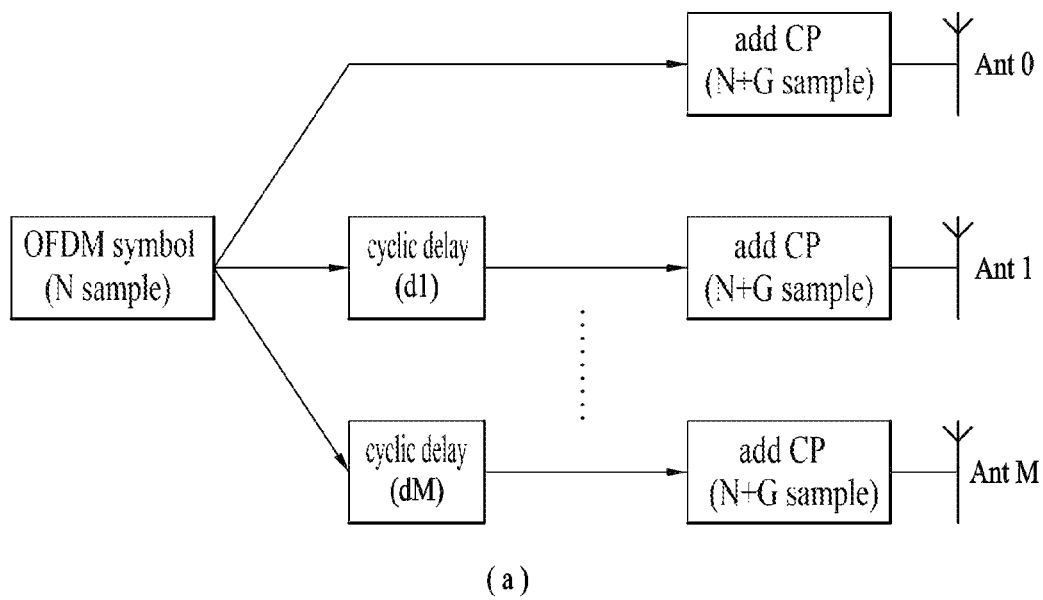
(a)
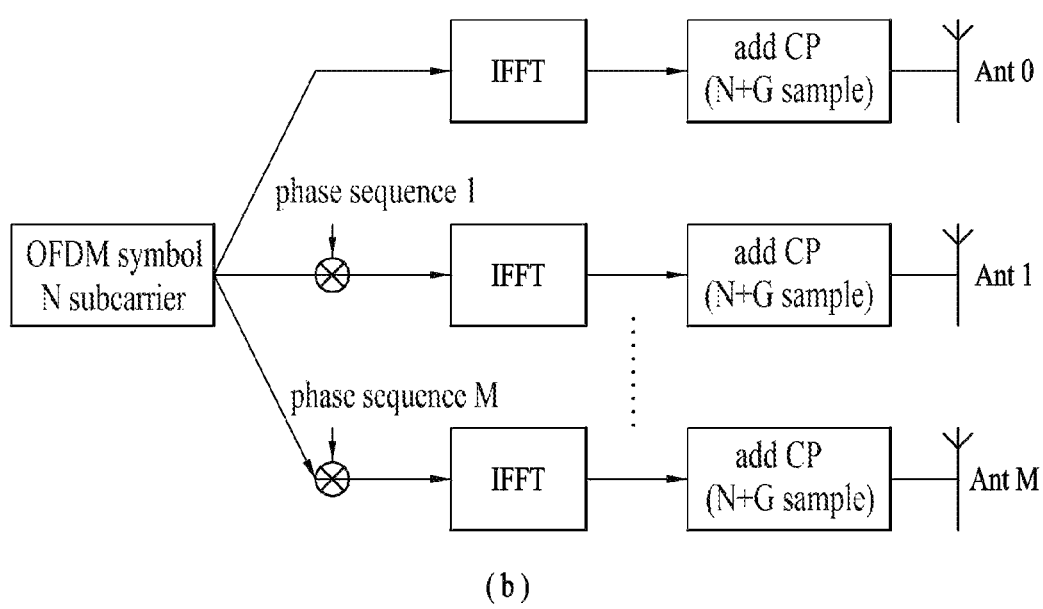
(b)

US 10,666,338 B2

CHANNEL QUALITY MEASUREMENT METHOD IN MULTIPLE ANTENNA WIRELESS COMMUNICATION SYSTEM AND DEVICE FOR SAME

This application is a 35 USC § 371 National Stage entry of International Application No. PCT/KR2015/005417 filed on May 29, 2015, and claims priority to U.S. Provisional Application No. 62/004,893 filed on May 30, 2014, all of which are hereby incorporated by reference in their entireties as if fully set forth herein.

TECHNICAL FIELD

The present invention relates to a wireless communication system, and more particularly, to a method of transmitting a signal in a multi-antenna wireless communication system and apparatus for the same.

BACKGROUND ART

Multiple input multiple output (MIMO) increases the efficiency of data transmission and reception using multiple transmit antennas and multiple receive antennas instead of a single transmission antenna and a single reception antenna. A receiver receives data through multiple paths when multiple antennas are used, whereas the receiver receives data through a single antenna path when a single antenna is used. Accordingly, MIMO can increase a data transmission rate and throughput and improve coverage.

A single cell MIMO scheme can be classified into a single user-MIMO (SU-MIMO) scheme for receiving a downlink signal by a single UE in one cell and a multi user-MIMO (MU-MIMO) scheme for receiving a downlink signal by two or more UEs.

Channel estimation refers to a procedure for compensating for signal distortion due to fading to restore a reception signal. Here, the fading refers to sudden fluctuation in signal intensity due to multipath-time delay in a wireless communication system environment. For channel estimation, a reference signal (RS) known to both a transmitter and a receiver is required. In addition, the RS can be referred to as a RS or a pilot signal according to applied standard.

A downlink RS is a pilot signal for coherent demodulation for a physical downlink shared channel (PDSCH), a physical control format indicator channel (PCFICH), a physical hybrid indicator channel (PHICH), a physical downlink control channel (PDCCH), etc. A downlink RS includes a common RS (CRS) shared by all user equipments (UEs) in a cell and a dedicated RS (DRS) for a specific UE. For a system (e.g., a system having extended antenna configuration LTE-A standard for supporting 8 transmission antennas) compared with a conventional communication system (e.g., a system according to LTE release-8 or 9) for supporting 4 transmission antennas, DRS based data demodulation has been considered for effectively managing RSs and supporting a developed transmission scheme. That is, for supporting data transmission through extended antennas, DRS for two or more layers can be defined. DRS is pre-coded by the same pre-coder as a pre-coder for data and thus a receiver can easily estimate channel information for data demodulation without separate precoding information.

A downlink receiver can acquire pre-coded channel information for extended antenna configuration through DRS but requires a separate RS other than DRS in order to non-pre-coded channel information. Accordingly, a receiver of a system according to LTE-A standard can define a RS for acquisition of channel state information (CSI), that is, CSI-RS.

DISCLOSURE OF THE INVENTION

Technical Task

The technical task of the present invention is to provide a method of measuring a channel quality in a wireless communication system and apparatus for the same.

It will be appreciated by persons skilled in the art that the objects that could be achieved with the present invention are not limited to what has been particularly described hereinabove and the above and other objects that the present invention could achieve will be more clearly understood from the following detailed description.

Technical Solutions

In a first technical aspect of the present invention, provided herein is a method of measuring a channel quality, which is measured by a base station equipped with a two-dimensional active antenna system including a plurality of antennas, including: receiving, from a user equipment, CSI (channel state information) on the plurality of the antennas, which is generated based on a first reference signal for some of the plurality of the antennas; selecting a precoding and a rank based on a PMI (precoding matrix indicator) and an RI (rank indicator) of the received CSI, respectively; generating a port by applying the selected precoding according to the selected rank; transmitting, to the user equipment, a DM-RS (demodulation-reference signal) and a PDSCH (physical downlink shared channel) configured for the user equipment through the generated port; and receiving, from the user equipment, CQI (channel quality indicator) feedback for reducing a CQI mismatch in the CSI. In this case, the CQI feedback may be generated based on the DM-RS.

Further, the CQI feedback may include a CQI value calculated based on the DM-RS.

Further, the CQI feedback may include differences between the CQI value and an MCS (modulation and coding scheme) level calculated based on the DM-RS and a CQI value and an MCS level calculated based on the first reference signal.

Additionally, the method may further include transmitting, to the user equipment, information indicating presence of CQI feedback transmission by using DCI (downlink control information) associated with the PDSCH.

Additionally, the method may further include transmitting, to the user equipment, information indicating presence of CQI feedback transmission by using DCI (downlink control information) for uplink.

In a second technical aspect of the present invention, provided herein is a method of measuring a channel quality, which is measured by a base station equipped with a two-dimensional active antenna system including a plurality of antennas, including: receiving, from a user equipment, CSI (channel state information) on the plurality of the antennas, which is generated based on a first reference signal for some of the plurality of the antennas; selecting a precoding and a rank based on a PMI (precoding matrix indicator) and an RI (rank indicator) of the received CSI, respectively; generating a port by applying the selected precoding according to the selected rank; transmitting, to the user equipment, a CSI-RS (CSI-reference signal) through the generated port; and receiving, from the user equipment, CQI (channel quality indicator) feedback for reducing a CQI mismatch in the CSI. In this case, the CQI feedback may be generated based on the CSI-RS.

Advantageous Effects

According to embodiments of the present invention, a method for more accurately measuring a channel quality in a multi-antenna system and apparatus for the same can be provided.

It will be appreciated by persons skilled in the art that that the effects achieved by the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention:

FIG. 3 is a diagram for a configuration of a general MIMO communication system;

FIG. 4 is a diagram for an example of a general CDD structure in a MIMO system;

BEST MODE FOR INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters. For example, the following detailed description is given under the assumption that 3GPP LTE mobile communication systems are used. However, the description may be applied to any other mobile communication system except for specific features inherent to the 3GPP LTE systems.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Moreover, in the following description, it is assumed that a terminal refers to a mobile or fixed type user equipment such as a user equipment (UE), and an advanced mobile station (AMS). Also, it is assumed that a base station refers to a random node of a network terminal, such as Node B, eNode B, and an access point (AP), which performs communication with the user equipment.

In a mobile communication system, a user equipment may receive information from a base station through a downlink and transmit information to the base station through an uplink. The information that the user equipment transmits or receives includes data and various types of control information. There are various physical channels according to the types and usages of information that the user equipment transmits or receives.

As an example of a mobile communication system to which the present invention is applicable, a 3rd Generation Partnership Project Long Term Evolution (hereinafter, referred to as LTE) communication system is described in brief.

Figure 1:
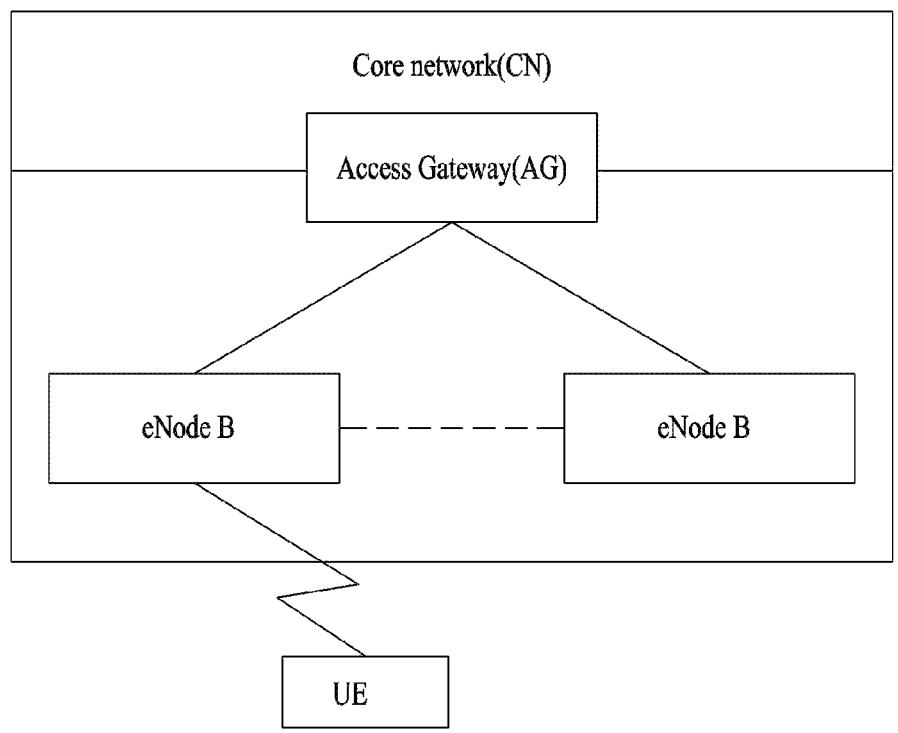
FIG. 1 is a diagram showing a network structure of an Evolved Universal Mobile Telecommunications System (E-UMTS) as an example of a wireless communication system.

FIG. 1 is a view schematically illustrating a network structure of an E-UMTS as an exemplary radio communication system.

An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information.

In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

Recently, 3GPP has standardized technology subsequent to LTE. In this specification, the technology will be referred to as "LTE-Advanced" or "LTE-A". A main difference between the LTE system and the LTE-A system is a system bandwidth. The LTE-A system aims to support a wideband of up to 100 MHz. To achieve this, the LTE-A system employs carrier aggregation or bandwidth aggregation that accomplishes a wideband using a plurality of frequency blocks. Carrier aggregation uses a plurality of frequency blocks as a large logical frequency band in order to achieve a wider frequency band. The bandwidth of each frequency block can be defined on the basis of a system block bandwidth used in the LTE system. Each frequency block is transmitted using a component carrier.

Figure 2:
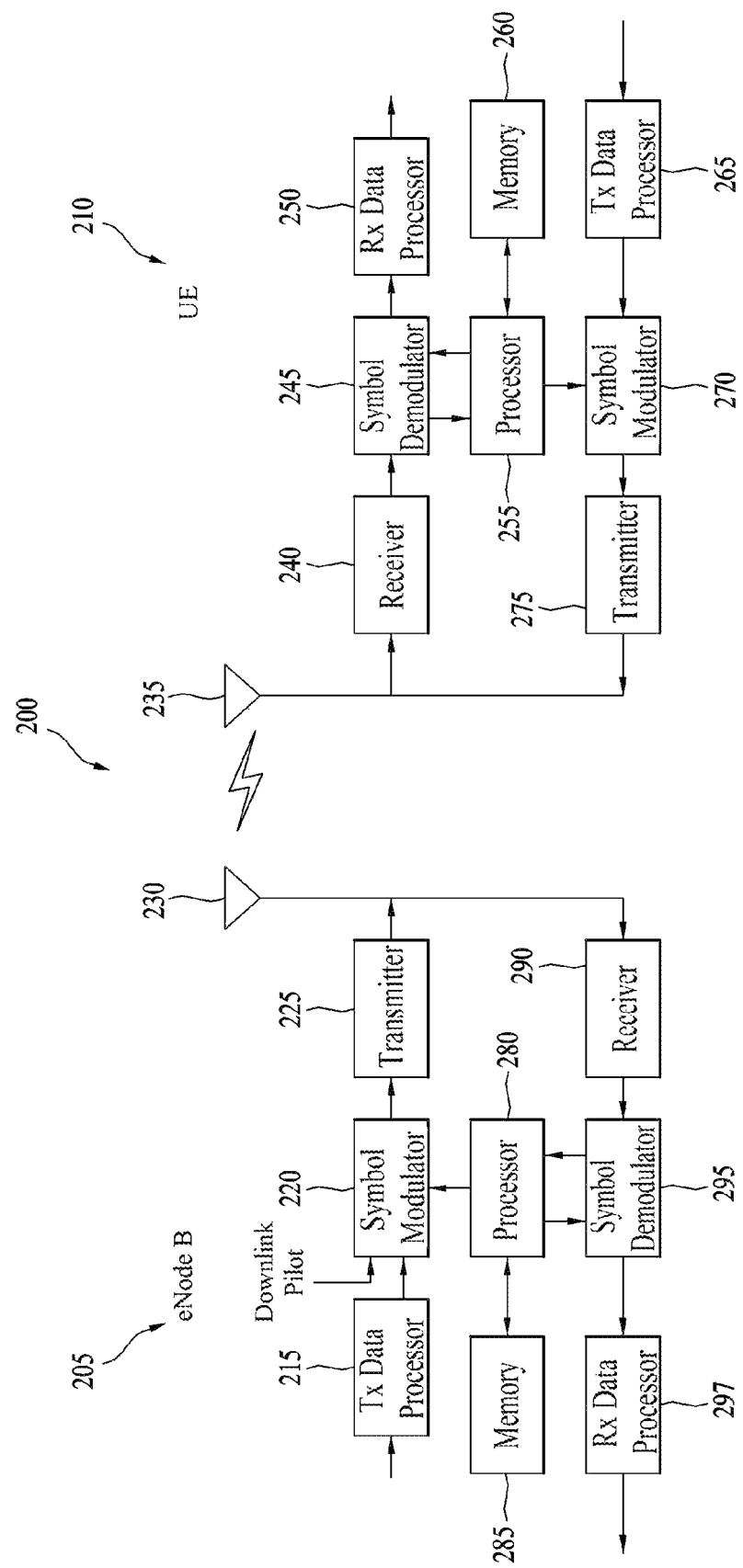
FIG. 2 is a block diagram illustrating configurations of a base station 205 and a user equipment 210 in a wireless communication system 200 according to the present invention.

FIG. 2 is a block diagram illustrating configurations of a base station 205 and a user equipment 210 in a wireless communication system 200.

Although one base station 205 and one user equipment 210 are shown for simplification of a wireless communication system 200, the wireless communication system 200 may include one or more base stations and/or one or more user equipments.

Referring to FIG. 2, the base station 105 may include a transmitting (Tx) data processor 215, a symbol modulator 220, a transmitter 225, a transmitting and receiving antenna 230, a processor 280, a memory 285, a receiver 290, a symbol demodulator 295, and a receiving (Rx) data processor 297. The user equipment 210 may include a Tx data processor 265, a symbol modulator 270, a transmitter 275, a transmitting and receiving antenna 235, a processor 255, a memory 260, a receiver 240, a symbol demodulator 255, and an Rx data processor 250. Although the antennas 230 and 235 are respectively shown in the base station 205 and the user equipment 210, each of the base station 205 and the user equipment 210 includes a plurality of antennas. Accordingly, the base station 205 and the user equipment 210 according to the present invention support a multiple input multiple output (MIMO) system. Also, the base station 205 according to the present invention may support both a single user-MIMO (SU-MIMO) system and a multi user-MIMO (MU-MIMO) system.

On a downlink, the Tx data processor 215 receives traffic data, formats and codes the received traffic data, interleaves and modulates (or symbol maps) the coded traffic data, and provides the modulated symbols ("data symbols"). The symbol modulator 220 receives and processes the data symbols and pilot symbols and provides streams of the symbols.

The symbol modulator 220 multiplexes the data and pilot symbols and transmits the multiplexed data and pilot symbols to the transmitter 225. At this time, the respective transmitted symbols may be a signal value of null, the data symbols and the pilot symbols. In each symbol period, the pilot symbols may be transmitted continuously. The pilot symbols may be frequency division multiplexing (FDM) symbols, orthogonal frequency division multiplexing (OFDM) symbols, time division multiplexing (TDM) symbols, or code division multiplexing (CDM) symbols.

The transmitter 225 receives the streams of the symbols and converts the received streams into one or more analog symbols. Also, the transmitter 225 generates downlink signals suitable for transmission through a radio channel by additionally controlling (for example, amplifying, filtering and frequency upconverting) the analog signals. Subsequently, the downlink signals are transmitted to the user equipment through the antenna 230.

In the user equipment 210, the antenna 235 receives the downlink signals from the base station 205 and provides the received signals to the receiver 240. The receiver 240 controls (for example, filters, amplifies and frequency downcoverts) the received signals and digitalizes the controlled signals to acquire samples. The symbol demodulator 245 demodulates the received pilot symbols and provides the demodulated pilot symbols to the processor 255 to perform channel estimation.

Also, the symbol demodulator 245 receives a frequency response estimation value for the downlink from the processor 255, acquires data symbol estimation values (estimation values of the transmitted data symbols) by performing data demodulation for the received data symbols, and provides the data symbol estimation values to the Rx data processor 250. The Rx data processor 250 demodulates (i.e., symbol de-mapping), deinterleaves, and decodes the data symbol estimation values to recover the transmitted traffic data.

Processing based on the symbol demodulator 245 and the Rx data processor 250 is complementary to processing based on the symbol demodulator 220 and the Tx data processor 215 at the base station 205.

On an uplink, the Tx data processor 265 of the user equipment 210 processes traffic data and provides data symbols. The symbol modulator 270 receives the data symbols, multiplexes the received data symbols with the pilot symbols, performs modulation for the multiplexed symbols, and provides the streams of the symbols to the transmitter 275. The transmitter 275 receives and processes the streams of the symbols and generates uplink signals. The uplink signals are transmitted to the base station 205 through the antenna 235.

The uplink signals are received in the base station 205 from the user equipment 210 through the antenna 230, and the receiver 290 processes the received uplink signals to acquire samples. Subsequently, the symbol demodulator 295 processes the samples and provides data symbol estimation values and the pilot symbols received for the uplink. The Rx data processor 297 recovers the traffic data transmitted from the user equipment 210 by processing the data symbol estimation values.

The processors 255 and 280 of the user equipment 210 and the base station 205 respectively command (for example, control, adjust, manage, etc.) the operation at the user equipment 210 and the base station 205. The processors 255 and 280 may respectively be connected with the memories 260 and 285 that store program codes and data. The memories 260 and 285 respectively connected to the processor 280 store operating system, application, and general files therein.

Each of the processors 255 and 280 may be referred to as a controller, a microcontroller, a microprocessor, and a microcomputer. Meanwhile, the processors 255 and 280 may be implemented by hardware, firmware, software, or their combination. If the embodiment of the present invention is implemented by hardware, application specific integrated circuits (ASICs), digital signal processors (DSPs), digital signal processing devices (DSPDs), programmable logic devices (PLDs), and field programmable gate arrays (FPGAs) configured to perform the embodiment of the present invention may be provided in the processors 255 and 280. Meanwhile, if the embodiment according to the present invention is implemented by firmware or software, firmware or software may be configured to include a module, a procedure, or a function, which performs functions or operations of the present invention. Firmware or software configured to perform the present invention may be provided in the processors 255 and 280, or may be stored in the memories 260 and 285 and driven by the processors 255 and 280.

Layers of a radio interface protocol between the user equipment 110 or the base station 105 and a wireless communication system (network) may be classified into a first layer L1, a second layer L2 and a third layer L3 on the basis of three lower layers of OSI (open system interconnection) standard model widely known in communication systems. A physical layer belongs to the first layer L1 and provides an information transfer service using a physical channel. A radio resource control (RRC) layer belongs to the third layer and provides control radio resources between the user equipment and the network. The user equipment and the base station may exchange RRC messages with each another through the RRC layer.

The term, base station used in the present invention may refer to a "cell or sector" when used as a regional concept. A serving base station (or serving cell) may be regarded as a base station which provides main services to UEs and may transmit and receive control information on a coordinated multiple transmission point. In this sense, the serving base station (or serving cell) may be referred to as an anchor base station (or anchor cell). Likewise, a neighboring base station may be referred to as a neighbor cell used as a local concept.

Multiple Antenna System

In the multiple antenna technology, reception of one whole message does not depend on a single antenna path. Instead, in the multiple antenna technology, data fragments received through multiple antennas are collected and combined to complete data. If the multiple antenna technology is used, a data transfer rate within a cell region of a specific size may be improved, or system coverage may be improved while ensuring a specific data transfer rate. In addition, this technology can be broadly used by mobile communication devices and relays. Due to the multiple antenna technology, restriction on mobile communication traffic based on a legacy technology using a single antenna can be solved.

FIG. 3(a) shows the configuration of a wireless communication system including multiple antennas. As shown in FIG. 3(a), the number of transmit (Tx) antennas and the number of Rx antennas respectively to $N_T$ and $N_R$, a theoretical channel transmission capacity of the MIMO communication system increases in proportion to the number of antennas, differently from the above-mentioned case in which only a transmitter or receiver uses several antennas, so that transmission rate and frequency efficiency can be greatly increased. In this case, the transfer rate acquired by the increasing channel transmission capacity can theoretically increase by a predetermined amount that corresponds to multiplication of a maximum transfer rate (Ro) acquired when one antenna is used and a rate of increase (Ri). The rate of increase (Ri) can be represented by the following equation 1.

$$R_i = \min(N_T, N_R) \quad \text{[Equation 1]}$$

For example, provided that a MIMO system uses four Tx antennas and four Rx antennas, the MIMO system can theoretically acquire a high transfer rate which is four times higher than that of a single antenna system. After the above-mentioned theoretical capacity increase of the MIMO system was demonstrated in the mid-1990s, many developers began to conduct intensive research into a variety of technologies which can substantially increase data transfer rate using the theoretical capacity increase. Some of the above technologies have been reflected in a variety of wireless communication standards, for example, third-generation mobile communication or next-generation wireless LAN, etc.

A variety of MIMO-associated technologies have been intensively researched by many companies or developers, for example, research into information theory associated with MIMO communication capacity under various channel environments or multiple access environments, research into a radio frequency (RF) channel measurement and modeling of the MIMO system, and research into a space-time signal processing technology.

Mathematical modeling of a communication method for use in the above-mentioned MIMO system will hereinafter be described in detail. As can be seen from FIG. 7, it is assumed that there are $N_T$ Tx antennas and $N_R$ Rx antennas. In the case of a transmission signal, a maximum number of transmission information pieces is $N_T$ under the condition that $N_T$ Tx antennas are used, so that the transmission information can be represented by a specific vector shown in the following equation 2.

$$s = [s_1, s_2, \ldots, s_{N_T}]^T \quad \text{[Equation 2]}$$

In the meantime, individual transmission information pieces $s_1, s_2, \ldots, s_{N_T}$ may have different transmission powers. In this case, if the individual transmission powers are denoted by $P_1, P_2, \ldots, P_{N_T}$, transmission information having an adjusted transmission power can be represented by a specific vector shown in the following equation 3.

$$\hat{s} = [\hat{s}_1, \hat{s}_2, \ldots, \hat{s}_{N_T}]^T = [P s_1, P s_2, \ldots, P s_{N_T}]^T \quad \text{[Equation 3]}$$

In Equation 3, $\hat{s}$ is a transmission vector, and can be represented by the following equation 4 using a diagonal matrix P of a transmission power.

$$\hat{s} = \begin{bmatrix} P_1 & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

In the meantime, the information vector $\hat{S}$ having an adjusted transmission power is applied to a weight matrix W, so that $N_T$ transmission signals $x_1, x_2, \ldots, x_{N_T}$ to be actually transmitted are configured. In this case, the weight matrix W is adapted to properly distribute transmission information to individual antennas according to transmission channel situations. The above-mentioned transmission signals $x_1, x_2, \ldots, x_{N_T}$ can be represented by the following equation 5 using the vector X. Here, $W_{ij}$ denotes a weight corresponding to i-th Tx antenna and j-th information. W represents a weight matrix or precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{12} & w_{12} & \cdots & w_{2N_T} \\ \vdots & & \ddots & \vdots \\ w_{i2} & w_{i2} & \cdots & w_{iN_T} \\ \vdots & & & \ddots & \vdots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = $$ [Equation 5]

$$W\hat{s} = WPs$$

Given $N_R$ Rx antennas, signals received at the respective Rx antennas, $y_1, y_2, \ldots y_{N_x}$ may be represented as the following vector.

$$y = [y_1, y_2, \ldots, y_{N_R}]^T \quad \text{[Equation 6]}$$

When channels are modeled in the MIMO communication system, they may be distinguished according to the indexes of Tx and Rx antennas and the channel between a $j^{th}$ Tx antenna and an $i^{th}$ Rx antenna may be represented as $h_{ij}$. It is to be noted herein that the index of the Rx antenna precedes that of the Tx antenna in $h_{ij}$.

The channels may be represented as vectors and matrices by grouping them. Examples of vector expressions are given as below. FIG. 3(b) illustrates channels from $N_T$ Tx antennas to an $i^{th}$ Rx antenna.

As illustrated in FIG. 3(b), the channels from the $N_T$ Tx antennas to an $i^{th}$ Rx antenna may be expressed as follows.

$$h_i^T = [h_{i1}, h_{i2}, \ldots, h_{iN_T}] \quad \text{[Equation 7]}$$

Also, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & & \ddots \\ h_{N_R1} & h_{N_R2} & \cdots & h_{N_RN_T} \end{bmatrix} \quad \text{[Equation 8]}$$

Actual channels experience the above channel matrix H and then are added with Additive White Gaussian Noise (AWGN). The AWGN $n_1, n_2, \ldots, n_{N_R}$ added to the $N_R$ Rx antennas is given as the following vector.

$$n = [n_1, n_2, \ldots, n_{N_R}]^T \quad \text{[Equation 9]}$$

From the above modeled equations, the received signal can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & & \ddots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = $$ [Equation 10]

$$Hx + n$$

In the meantime, the numbers of rows and columns in the channel matrix H representing channel states are determined according to the numbers of Tx and Rx antennas. The number of rows is identical to that of Rx antennas, $N_R$ and the number of columns is identical to that of Tx antennas, $N_T$. Thus, the channel matrix H is of size $N_R \times N_T$. In general, the rank of a matrix is defined as the smaller between the numbers of independent rows and columns. Accordingly, the rank of the matrix is not larger than the number of rows or columns. The rank of the matrix H, rank(H) is limited as follows.

$$\text{rank}(H) \leq \min(N_T, N_R) \quad \text{[Equation 11]}$$

As a multi-antenna transmission and reception scheme used for operating a multi-antenna system, it may be able to use FSTD (frequency switched transmit diversity), SFBC (Space Frequency Block Code), STBC (Space Time Block Code), CDD (Cyclic Delay Diversity), TSTD (time switched transmit diversity) and the like. In a rank 2 or higher, SM (Spatial Multiplexing), GCDD (Generalized Cyclic Delay Diversity), S-VAP (Selective Virtual Antenna Permutation) and the like can be used.

The FSTD corresponds to a scheme of obtaining a diversity gain by assigning a subcarrier of a different frequency to a signal transmitted by each of multiple antennas. The SFBC corresponds to a scheme capable of securing both a diversity gain in a corresponding dimension and a multi-user scheduling gain by efficiently applying selectivity in a spatial domain and a frequency domain. The STBC corresponds to a scheme of applying selectivity in a spatial domain and a time domain. The CDD corresponds to a scheme of obtaining a diversity gain using path delay between transmission antennas. The TSTD corresponds to a scheme of distinguishing signals transmitted by multiple antennas from each other on the basis of time. The spatial multiplexing (SM) corresponds to a scheme of increasing a transfer rate by transmitting a different data according to an antenna. The GCDD corresponds to a scheme of applying selectivity in a time domain and a frequency domain. The S-VAP corresponds to a scheme of using a single precoding matrix. The S-VAP can be classified into an MCW (multi codeword) S-VAP for mixing multiple codewords between antennas in spatial diversity or spatial multiplexing and an SCW (single codeword) S-VAP for using a single codeword.

Among the aforementioned MIMO transmission schemes, the STBC scheme corresponds to a scheme of obtaining time diversity in a manner that an identical data symbol is repeated in a time domain to support orthogonality. Similarly, the SFBC scheme corresponds to a scheme of obtaining frequency diversity in a manner that an identical data symbol is repeated in a frequency domain to support orthogonality. Examples of a time block code used for the STBC and a frequency block code used for the SFBC can be represented as equation 12 and equation 13, respectively. The equation 12 indicates a block code in case of 2 transmission antennas and the equation 13 indicates a block code in case of 4 transmission antennas.

$$\frac{1}{\sqrt{2}} \begin{pmatrix} S_1 & S_2 \\ -S_2^* & S_1^* \end{pmatrix} \quad \text{[Equation 12]}$$

$$\frac{1}{\sqrt{2}} \begin{pmatrix} S_1 & S_2 & 0 & 0 \\ 0 & 0 & S_3 & S_4 \\ -S_2^* & S_1^* & 0 & 0 \\ 0 & 0 & -S_4^* & S_3^* \end{pmatrix} \quad \text{[Equation 13]}$$

In the equations 12 and 13, Si (i=1, 2, 3, 4) corresponds to a modulated data symbol. And, in the equations 12 and 13, a row of a matrix corresponds to an antenna port and a column of the matrix corresponds to time (STBC) or frequency (SFBC).

Meanwhile, among the aforementioned MIMO transmission schemes, the CDD scheme corresponds to a scheme of increasing frequency diversity by increasing delay propagation on purpose. FIG. 4 shows an example of a general CDD structure in a multi-antenna system. FIG. 4 (a) shows a scheme of applying cyclic delay in time domain. As shown in FIG. 4 (b), the CDD scheme applying the cyclic delay of FIG. 4 (a) can also be implemented by applying phase-shift diversity.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the reception signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs in a mobile communication system may be divided into two types according to their purposes: RS for channel information acquisition and RS for data demodulation. Since its purpose lies in that a UE acquires downlink channel information, the former should be transmitted in a broad band and received and measured even by a UE that does not receive downlink data in a specific subframe. This RS is also used in a situation like handover. The latter is an RS that an eNB transmits along with downlink data in specific resources. A UE can estimate a channel by receiving the RS and accordingly can demodulate data. The RS should be transmitted in a data transmission area.

A legacy 3GPP LTE (e.g., 3GPP LTE release-8) system defines two types of downlink RSs for unicast services: a common RS (CRS) and a dedicated RS (DRS). The CRS is used for acquisition of information about a channel state, measurement of handover, etc. and may be referred to as a cell-specific RS. The DRS is used for data demodulation and may be referred to as a UE-specific RS. In a legacy 3GPP LTE system, the DRS is used for data demodulation only and the CRS can be used for both purposes of channel information acquisition and data demodulation.

CRSs, which are cell-specific, are transmitted across a wideband in every subframe. According to the number of Tx antennas at an eNB, the eNB may transmit CRSs for up to four antenna ports. For instance, an eNB with two Tx antennas transmits CRSs for antenna port 0 and antenna port 1. If the eNB has four Tx antennas, it transmits CRSs for respective four Tx antenna ports, antenna port 0 to antenna port 3.

Figure 5:
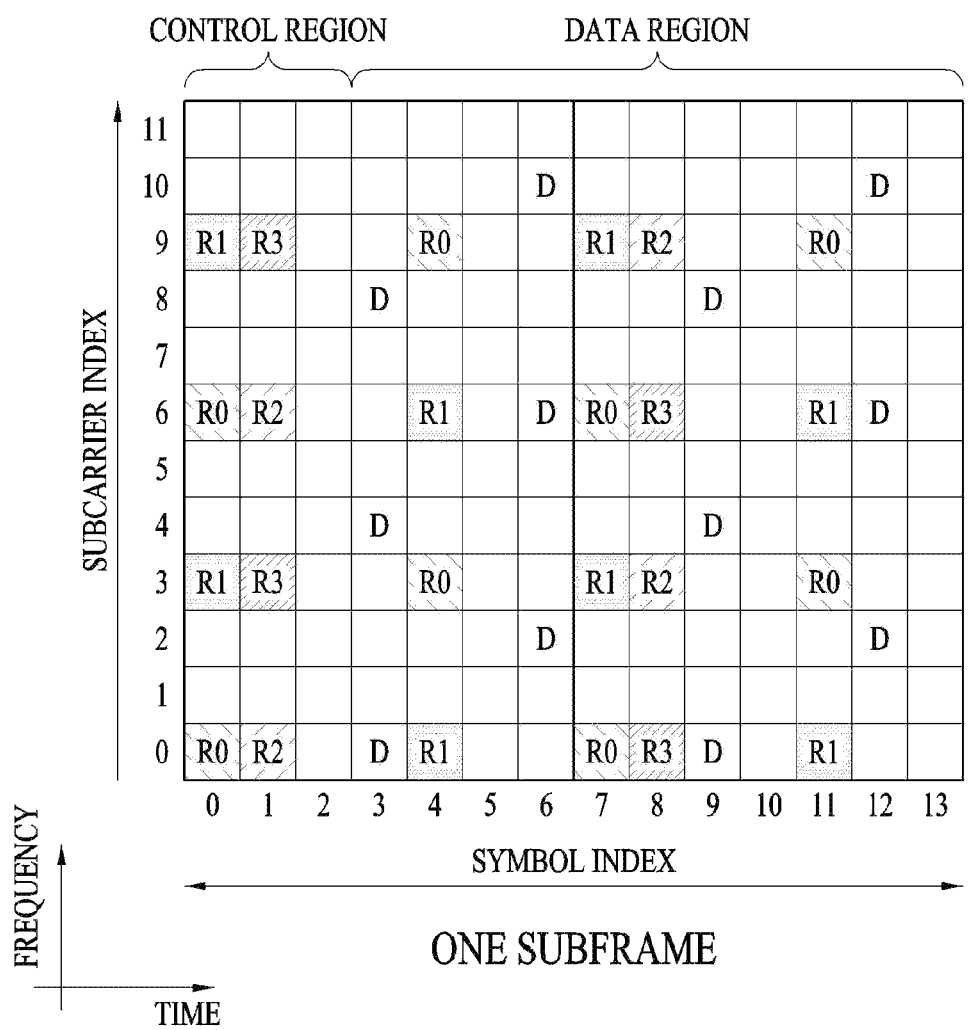
FIG. 5 is a diagram illustrating legacy CRS and DRS patterns.

FIG. 5 illustrates a CRS and DRS pattern for an RB (including 14 OFDM symbols in time by 12 subcarriers in frequency in case of a normal CP) in a system where an eNB has four Tx antennas. In FIG. 5, REs labeled with 'R0', 'R1', 'R2' and 'R3' represent the positions of CRSs for antenna port 0 to antenna port 4, respectively. REs labeled with 'D' represent the positions of DRSs defined in the LTE system.

The LTE-A system, an evolution of the LTE system, can support up to eight Tx antennas. Therefore, it should also support RSs for up to eight Tx antennas. Because downlink RSs are defined only for up to four Tx antennas in the LTE system, RSs should be additionally defined for five to eight Tx antenna ports, when an eNB has five to eight downlink Tx antennas in the LTE-A system. Both RSs for channel measurement and RSs for data demodulation should be considered for up to eight Tx antenna ports.

One of significant considerations for design of the LTE-A system is backward compatibility. Backward compatibility is a feature that guarantees a legacy LTE terminal to operate normally even in the LTE-A system. If RSs for up to eight Tx antenna ports are added to a time-frequency area in which CRSs defined by the LTE standard are transmitted across a total frequency band in every subframe, RS overhead becomes huge. Therefore, new RSs should be designed for up to eight antenna ports in such a manner that RS overhead is reduced.

Largely, new two types of RSs are introduced to the LTE-A system. One type is CSI-RS serving the purpose of channel measurement for selection of a transmission rank, a modulation and coding scheme (MCS), a precoding matrix index (PMI), etc. The other type is demodulation RS (DM RS) for demodulation of data transmitted through up to eight Tx antennas.

Compared to the CRS used for both purposes of measurement such as channel measurement and measurement for handover and data demodulation in the legacy LTE system, the CSI-RS is designed mainly for channel estimation, although it may also be used for measurement for handover. Since CSI-RSs are transmitted only for the purpose of acquisition of channel information, they may not be transmitted in every subframe, unlike CRSs in the legacy LTE system. Accordingly, CSI-RSs may be configured so as to be transmitted intermittently (e.g. periodically) along the time axis, for reduction of CSI-RS overhead.

When data is transmitted in a downlink subframe, DM RSs are also transmitted dedicatedly to a UE for which the data transmission is scheduled. Thus, DM RSs dedicated to a particular UE may be designed such that they are transmitted only in a resource area scheduled for the particular UE, that is, only in a time-frequency area carrying data for the particular UE.

Figure 6:
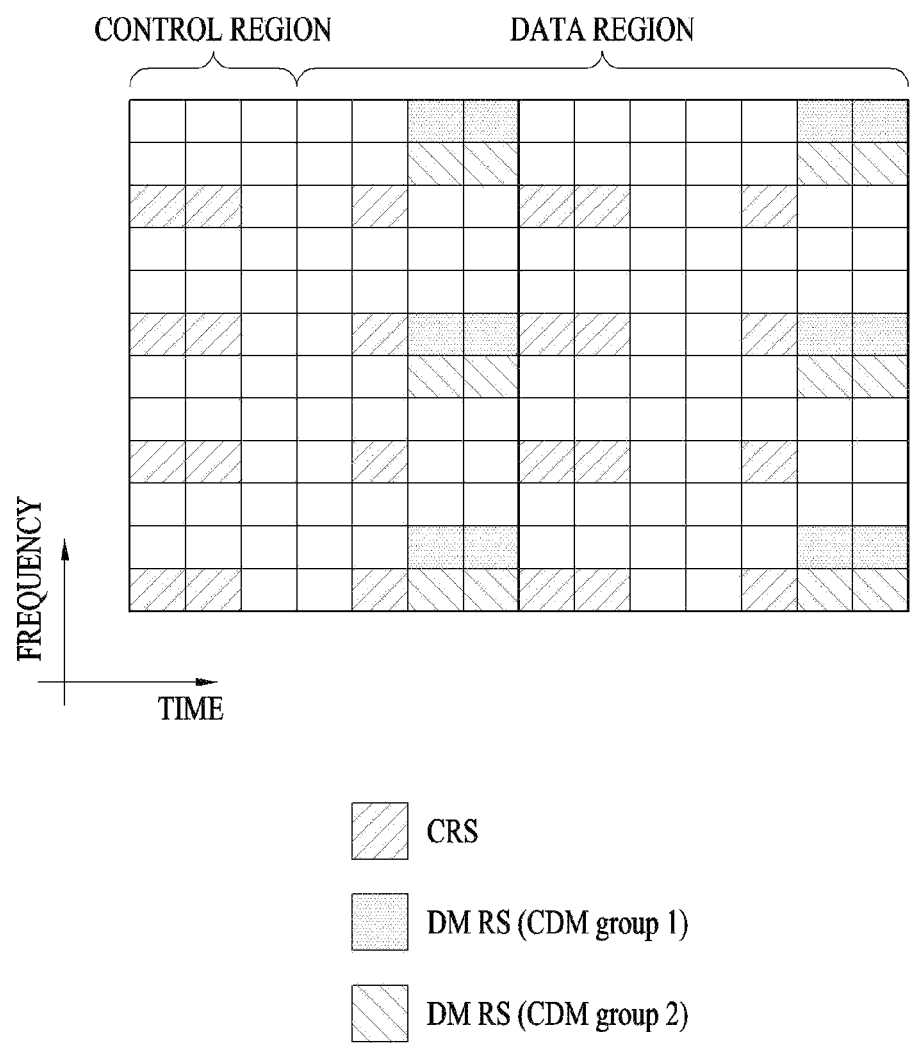
FIG. 6 is a diagram illustrating an example of a DM RS pattern.

FIG. 6 illustrates an exemplary DM RS pattern defined for the LTE-A system. In FIG. 6, the positions of REs carrying DM RSs in an RB carrying downlink data (an RB having 14 OFDM symbols in time by 12 subcarriers in frequency in case of a normal CP) are marked. DM RSs may be transmitted for additionally defined four antenna ports, antenna port 7 to antenna port 10 in the LTE-A system. DM RSs for different antenna ports may be identified by their different frequency resources (subcarriers) and/or different time resources (OFDM symbols). This means that the DM RSs may be multiplexed in frequency division multiplexing (FDM) and/or time division multiplexing (TDM). If DM RSs for different antenna ports are positioned in the same time-frequency resources, they may be identified by their different orthogonal codes. That is, these DM RSs may be multiplexed in Code Division Multiplexing (CDM). In the illustrated case of FIG. 6, DM RSs for antenna port 7 and antenna port 8 may be located on REs of DM RS CDM group 1 through multiplexing based on orthogonal codes. Similarly, DM RSs for antenna port 9 and antenna port 10 may be located on REs of DM RS CDM group 2 through multiplexing based on orthogonal codes.

Figure 7:
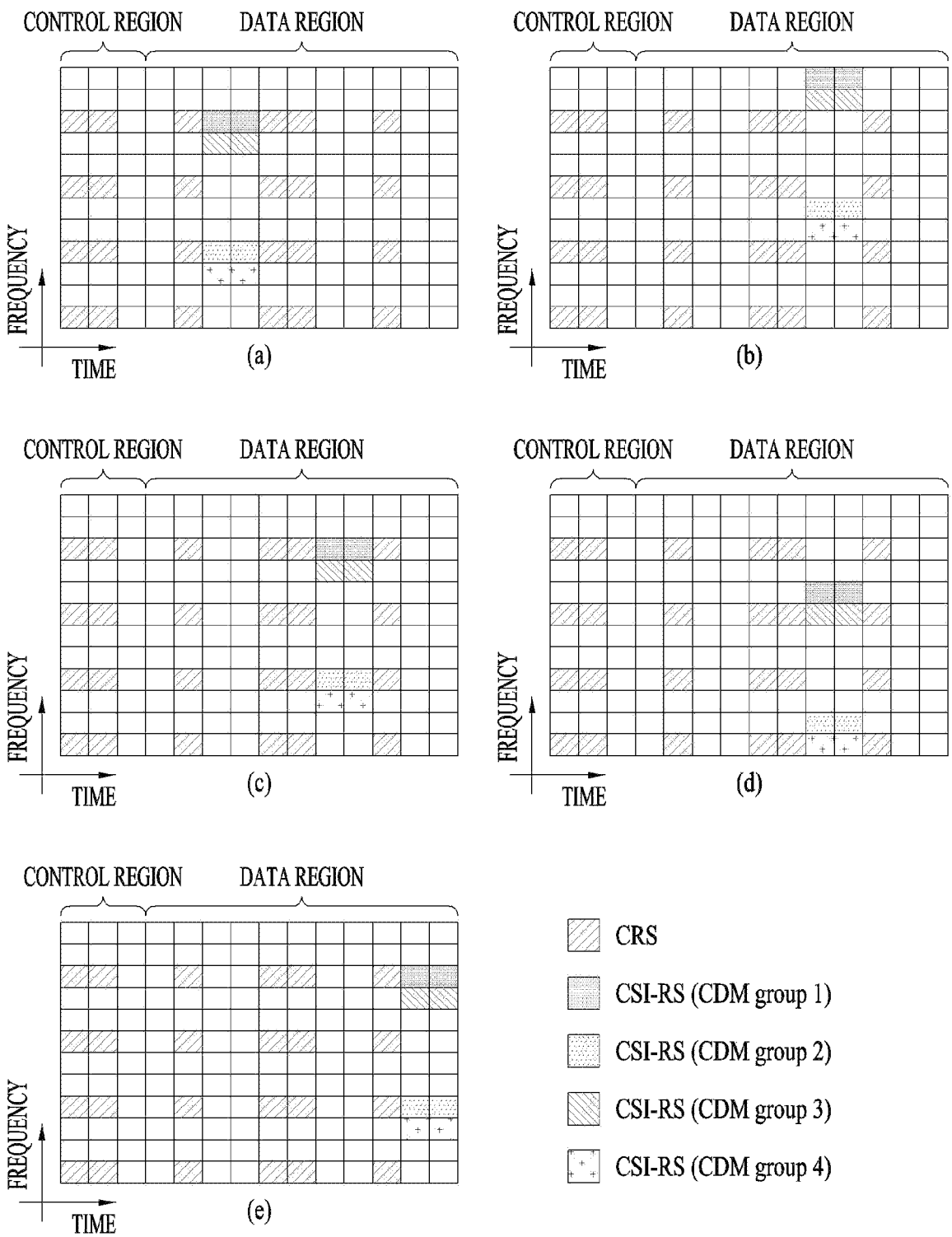
FIG. 7 is a diagram illustrating examples of a CSI-RS pattern.

FIG. 7 illustrates exemplary CSI-RS patterns defined for the LTE-A system. In FIG. 7, the positions of REs carrying CSI-RSs in an RB carrying downlink data (an RB having 14 OFDM symbols in time by 12 subcarriers in frequency in case of a normal CP) are marked. One of the CSI-RS patterns illustrated in FIGS. 7(a) to 7(e) is available for any downlink subframe. CSI-RSs may be transmitted for eight antenna ports supported by the LTE-A system, antenna port 15 to antenna port 22. CSI-RSs for different antenna ports may be identified by their different frequency resources (subcarriers) and/or different time resources (OFDM symbols). This means that the CSI-RSs may be multiplexed in FDM and/or TDM. CSI-RSs positioned in the same time-frequency resources for different antenna ports may be identified by their different orthogonal codes. That is, these DM RSs may be multiplexed in CDM. In the illustrated case of FIG. 7(a), CSI-RSs for antenna port 15 and antenna port 16 may be located on REs of CSI-RS CDM group 1 through multiplexing based on orthogonal codes. CSI-RSs for antenna port 17 and antenna port 18 may be located on REs of CSI-RS CDM group 2 through multiplexing based on orthogonal codes. CSI-RSs for antenna port 19 and antenna port 20 may be located on REs of CSI-RS CDM group 3 through multiplexing based on orthogonal codes. CSI-RSs for antenna port 21 and antenna port 22 may be located on REs of CSI-RS CDM group 4 through multiplexing based on orthogonal codes. The same principle described with reference to FIG. 7(a) is applicable to the CSI-RS patterns illustrated in FIGS. 7(b) to 7(e).

RS patterns shown in FIGS. 5 to 7 are disclosed only for illustrative purposes, and the scope or spirit of the present invention are not limited only to a specific RS pattern. That is, even in the case in which RS patterns different from those of FIGS. 5 to 7 are defined and used, various embodiments of the present invention can also be equally applied thereto without difficulty.

CSI-RS Configuration

Among a plurality of CSI-RSs and a plurality of IMRs set to a UE, one CSI process can be defined in a manner of associating a CSI-RS resource for measuring a signal with an interference measurement resource (IMR) for measuring interference. A UE feedbacks CSI information induced from CSI processes different from each other to a network (e.g., base station) with an independent period and a subframe offset.

In particular, each CSI process has an independent CSI feedback configuration. The base station can inform the UE of the CS-RS resource, the IMR resource association information and the CSI feedback configuration via higher layer signaling. For example, assume that three CSI processes shown in Table 1 are set to the UE.

TABLE 1

| CSI Process | Signal Measurement Resource (SMR) | IMR |
| --- | --- | --- |
| CSI process 0 | CSI-RS 0 | IMR 0 |
| CSI process 1 | CSI-RS 1 | IMR 1 |
| CSI process 2 | CSI-RS 0 | IMR 2 |

In Table 1, a CSI-RS 0 and a CSI-RS 1 indicate a CSI-RS received from a cell 1 corresponding to a serving cell of a UE and a CSI-RS received from a cell 2 corresponding to a neighbor cell participating in cooperation, respectively. IMRs set to each of the CSI processes shown in Table 1 are shown in Table 2.

TABLE 2

| IMR | eNB 1 | eNB 2 |
| --- | --- | --- |
| IMR 0 | Muting | Data transmission |
| IMR 1 | Data transmission | Muting |
| IMR 2 | Muting | Muting |

A cell 1 performs muting in an IMR 0 and a cell 2 performs data transmission in the IMR 0. A UE is configured to measure interference from other cells except the cell 1 in the IMR 0. Similarly, the cell 2 performs muting in an IMR 1 and the cell 1 performs data transmission in the IMR 1. The UE is configured to measure interference from other cells except the cell 2 in the IMR 1. The cell 1 and the cell 2 perform muting in an IMR 2 and the UE is configured to measure interference from other cells except the cell 1 and the cell 2 in the IMR 2.

Hence, as shown in Table 1 and Table 2, if data is received from the cell 1, CSI information of the CSI process 0 indicates optimized RI, PMI and CQI information. If data is received from the cell 2, CSI information of the CSI process 1 indicates optimized RI, PMI and CQI information. If data is received from the cell 1 and there is no interference from the cell 2, CSI information of the CSI process 2 indicates optimized RI, PMI and CQI information.

It is preferable for a plurality of CSI processes set to a UE to share values subordinate to each other. For example, in case of joint transmission performed by the cell 1 and the cell 2, if a CSI process 1 considering a channel of the cell 1 as a signal part and a CSI process 2 considering a channel of the cell 2 as a signal part are set to a UE, it is able to easily perform JT scheduling only when ranks of the CSI process 1 and the CSI process 2 and a selected subband index are identical to each other.

A period or a pattern of transmitting a CSI-RS can be configured by a base station. In order to measure the CSI-RS, a UE should be aware of CSI-RS configuration of each CSI-RS antenna port of a cell to which the UE belongs thereto. The CSI-RS configuration can include a DL subframe index in which the CSI-RS is transmitted, time-frequency location of a CSI-RS resource element (RE) in a transmission subframe (e.g., the CSI-RS patterns shown in FIGS. 7(a) to 7(e)) and a CSI-RS sequence (a sequence used for a CSI-RS usage, the sequence is pseudo-randomly generated according to a prescribed rule based on a slot number, a cell ID, a CP length and the like), etc. In particular, a plurality of CSI-RS configurations can be used by a random (given) base station and the base station can inform a UE(s) in a cell of a CSI-RS configuration to be used for the UE(s).

Since it is necessary to identify a CSI-RS for each antenna port, resources to which the CSI-RS for each antenna port is transmitted should be orthogonal to each other. As mentioned earlier with reference to FIG. 7, the CSI-RS for each antenna port can be multiplexed by the FDM, the TDM and/or the CDM scheme using an orthogonal frequency resource, an orthogonal time resource and/or an orthogonal code resource.

When the base station informs the UEs in a cell of information on a CSI-RS (CSI-RS configuration), it is necessary for the base station to preferentially inform the UEs of information on time-frequency to which the CSI-RS for each antenna port is mapped. Specifically, information on time can include numbers of subframes in which a CSI-RS is transmitted, a period of transmitting a CSI-RS, a subframe offset of transmitting a CSI-RS, an OFDM symbol number in which a CSI-RS resource element (RE) of a specific antenna is transmitted, etc. Information on frequency can include a frequency space of transmitting a CSI-RS resource element (RE) of a specific antenna, an RE offset on a frequency axis, a shift value, etc.

Figure 8:
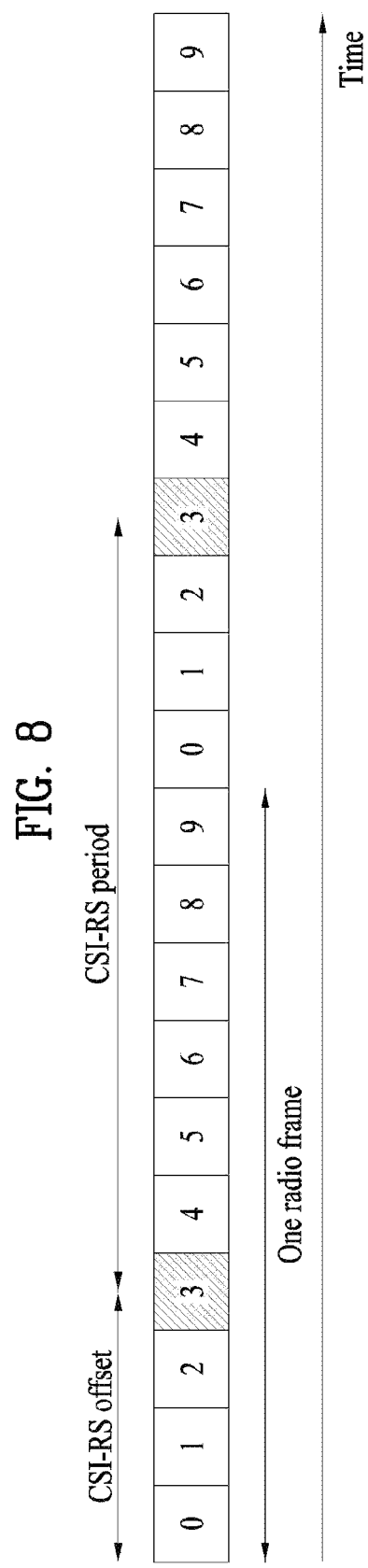
FIG. 8 is a diagram for explaining an example of a scheme of periodically transmitting a CSI-RS.

FIG. 8 is a diagram for explaining an example of a scheme of periodically transmitting a CSI-RS. A CSI-RS can be periodically transmitted with a period of an integer multiple of a subframe (e.g., 5-subframe period, 10-subframe period, 20-subframe period, 40-subframe period or 80-subframe period).

FIG. 8 shows a radio frame configured by 10 subframes (subframe number 0 to 9). In FIG. 8, for example, a transmission period of a CSI-RS of a base station corresponds to 10 ms (i.e., 10 subframes) and a CSI-RS transmission offset corresponds to 3. The offset value may vary depending on a base station to make CSI-RSs of many cells to be evenly distributed in time domain. If a CSI-RS is transmitted with a period of 10 ms, an offset value may have one selected from among 0 to 9. Similarly, if a CSI-RS is transmitted with a period of 5 ms, an offset value may have one selected from among 0 to 4. If a CSI-RS is transmitted with a period of 20 ms, an offset value may have one selected from among 0 to 19. If a CSI-RS is transmitted with a period of 40 ms, an offset value may have one selected from among 0 to 39. If a CSI-RS is transmitted with a period of 80 ms, an offset value may have one selected from among 0 to 79. The offset value corresponds to a value of a subframe in which CSI-RS transmission starts by a base station transmitting a CSI-RS with a prescribed period. If the base station informs a UE of a transmission period of a CSI-RS and an offset value, the UE is able to receive the CSI-RS of the base station at a corresponding subframe position using the transmission period and the offset value. The UE measures a channel through the received CSI-RS and may be then able to report such information as a CQI, a PMI and/or an RI (rank indicator) to the base station. In the present disclosure, the CQI, the PMI and/or the RI can be commonly referred to as CQI (or CSI) except a case of individually explaining the CQI, the PMI and/or the RI. And, the CSI-RS transmission period and the offset can be separately designated according to a CSI-RS configuration.

Figure 9:
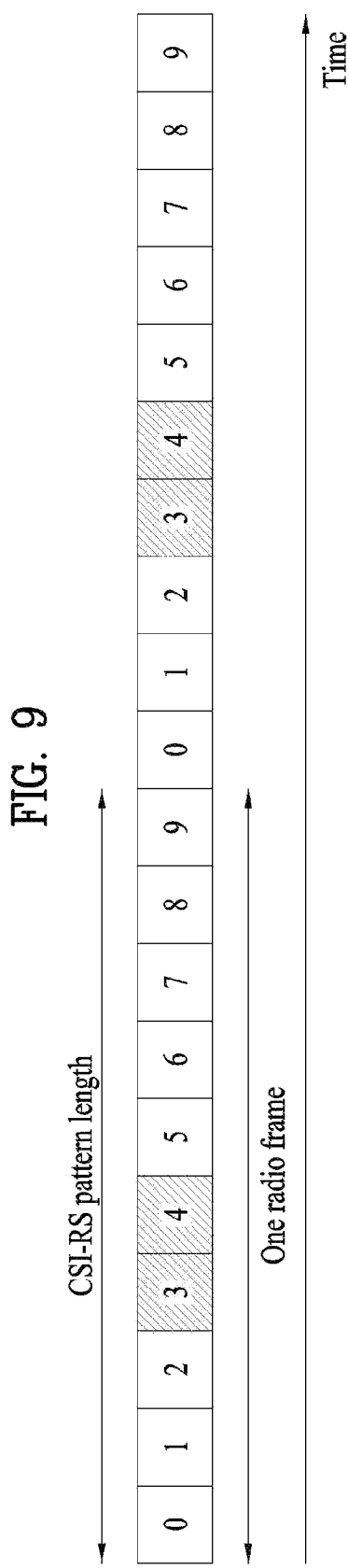
FIG. 9 is a diagram for explaining an example of a scheme of aperiodically transmitting a CSI-RS.

FIG. 9 is a diagram for explaining an example of a scheme of aperiodically transmitting a CSI-RS. In FIG. 9, for example, one radio frame is configured by 10 subframes (subframe number 0 to 9). As shown in FIG. 9, a subframe in which a CSI-RS is transmitted can be represented as a specific pattern. For example, a CSI-RS transmission pattern can be configured by a 10-subframe unit and whether to transmit a CSI-RS can be indicated by a 1-bit indicator in each subframe. An example of FIG. 9 shows a pattern of transmitting a CSI-RS in a subframe index 3 and 4 among 10 subframes (subframe index 0 to 9). The indicator can be provided to a UE via higher layer signaling.

As mentioned in the foregoing description, configuration of CSI-RS transmission can be variously configured. In order to make a UE properly receive a CSI-RS and perform channel measurement, it is necessary for a base station to inform the UE of CSI-RS configuration. Embodiments of the present invention for informing a UE of CSI-RS configuration are explained in the following.

Method of Indicating CSI-RS Configuration

In general, a base station is able to inform a UE of CSI-RS configuration by one of two schemes in the following.

A first scheme is a scheme that a base station broadcasts information on CSI-RS configuration to UEs using dynamic broadcast channel (DBCH) signaling.

In a legacy LTE system, when a base station informs UEs of contents on system information, the information is transmitted to the UEs via a BCH (broadcasting channel). Yet, if the contents are too much and the BCH is unable to carry all of the contents, the base station transmits the system information using a scheme used for transmitting a general downlink data. And, PDCCH CRC of corresponding data is transmitted in a manner of being masked using SI-RNTI, i.e., system information RNTI, instead of a specific UE ID (e.g., C-RNTI). In this case, actual system information is transmitted to a PDSCH region together with a general unicast data. By doing so, all UEs in a cell decode PDCCH using the SI-RNTI, decode PDSCH indicated by the corresponding PDCCH and may be then able to obtain the system information. This type of broadcasting scheme may be referred to as a DBCH (dynamic BCH) to differentiate it from a general broadcasting scheme, i.e., PBCH (physical BCH).

Meanwhile, system information broadcasted in a legacy LTE system can be divided into two types. One is a master information block (MIB) transmitted on the PBCH and another one is a system information block (SIB) transmitted on a PDSCH region in a manner of being multiplexed with a general unicast data. In the legacy LTE system, since informations transmitted with an SIB type 1 to an SIB type 8 (SIB1 to SIB8) are already defined, it may be able to define a new SIB type to transmit information on a CSI-RS configuration corresponding to new system information not defined in the legacy SIB types. For example, it may be able to define SIB9 or SIB10 and the base station can inform UEs within a cell of the information on the CSI-RS configuration via the SIBS or the SIB10 using a DBCH scheme.

A second scheme is a scheme that a base station informs each UE of information on CSI-RS configuration using RRC (radio resource control) signaling. In particular, the information on the CSI-RS can be provided to each of the UEs within a cell using dedicated RRC signaling. For example, in the course of establishing a connection with the base station via an initial access or handover of a UE, the base station can inform the UE of the CSI-RS configuration via RRC signaling. Or, when the base station transmits an RRC signaling message, which requires channel status feedback based on CSI-RS measurement, to the UE, the base station can inform the UE of the CSI-RS configuration via the RRC signaling message.

Indication of CSI-RS Configuration

A random base station may use a plurality of CSI-RS configurations and the base station can transmit a CSI-RS according to each of a plurality of the CSI-RS configurations to a UE in a predetermined subframe. In this case, the base station informs the UE of a plurality of the CSI-RS configurations and may be able to inform the UE of a CSI-RS to be used for measuring a channel state for making a feedback on a CQI (channel quality information) or CSI (channel state information).

Embodiments for a base station to indicate a CSI-RS configuration to be used in a UE and a CSI-RS to be used for measuring a channel are explained in the following.

Figure 10:
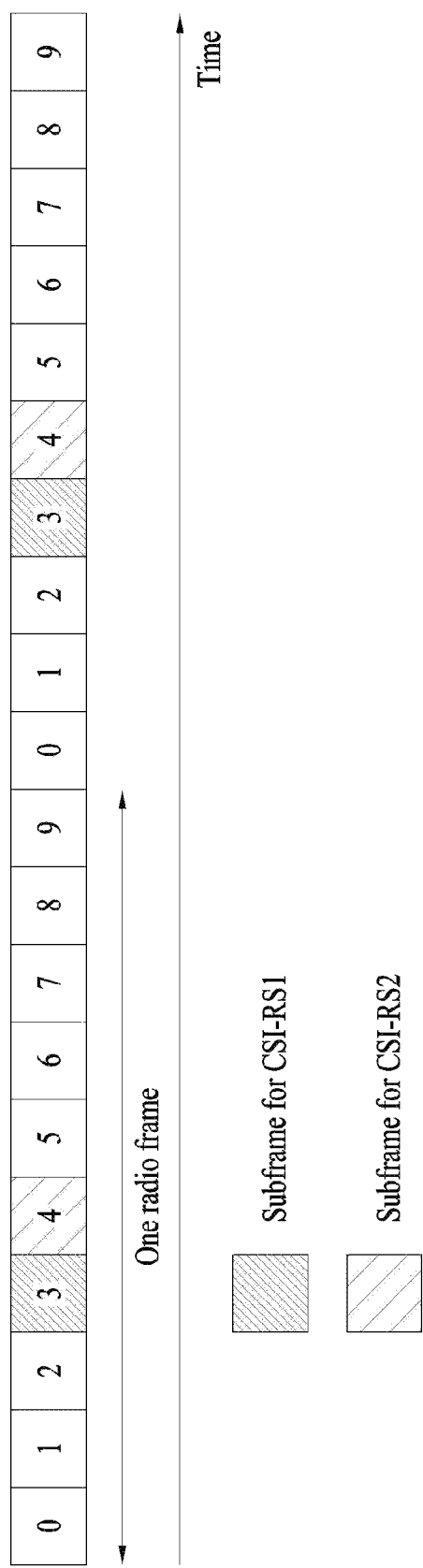
FIG. 10 is a diagram for explaining an example of using two CSI-RS configurations.

FIG. 10 is a diagram for explaining an example of using two CSI-RS configurations. In FIG. 10, for example, one radio frame is configured by 10 subframes (subframe number 0 to 9). In FIG. 10, in case of a first CSI-RS configuration, i.e., a CSI-RS1, a transmission period of a CSI-RS is 10 ms and a transmission offset of a CSI-RS is 3. In FIG. 10, in case of a second CSI-RS configuration, i.e., a CSI-RS2, a transmission period of a CSI-RS is 10 ms and a transmission offset of a CSI-RS is 4. A base station informs a UE of information on two CSI-RS configurations and may be able to inform the UE of a CSI-RS configuration to be used for CQI (or CSI) feedback among the two CSI-RS configurations.

If the base station asks the UE to make a CQI feedback on a specific CSI-RS configuration, the UE can perform channel state measurement using a CSI-RS belonging to the CSI-RS configuration only. Specifically, a channel state is determined based on CSI-RS reception quality, an amount of noise/interference and a function of a correlation coefficient. In this case, the CSI-RS reception quality is measured using the CSI-RS belonging to the CSI-RS configuration only. In order to measure the amount of noise/interference and the correlation coefficient (e.g., an interference covariance matrix indicating interference direction, etc.), measurement can be performed in a subframe in which the CSI-RS is transmitted or a subframe designated in advance. For example, in the embodiment of FIG. 10, if the base station asks the UE to make a feedback on the first CSI-RS configuration (CSI-RS1), the UE measures reception quality using a CSI-RS transmitted in a fourth subframe (a subframe index 3) of a radio frame and the UE can be separately designated to use an add number subframe to measure the amount of noise/interference and the correlation coefficient. Or, it is able to designate the UE to measure the CSI-RS reception quality, the amount of noise/interference and the correlation coefficient in a specific single subframe (e.g., a subframe index 3) only.

For example, reception signal quality measured using a CSI-RS can be simply represented by SINR (signal-to-interference plus noise ratio) as S/(I+N) (in this case, S corresponds to strength of a reception signal, I corresponds to an amount of interference and N corresponds to an amount of noise). The S can be measured through a CSI-RS in a subframe including the CSI-RS in a subframe including a signal transmitted to a UE. Since the I and the N change according to an amount of interference received from a neighbor cell, direction of a signal received from a neighbor cell, and the like, the I and the N can be measured by a CRS transmitted in a subframe in which the S is measured or a separately designated subframe, etc.

In this case, the amount of noise/interference and the correlation coefficient can be measured in a resource element (RE) in which a CRS belonging to a corresponding subframe or a CSI-RS is transmitted. Or, in order to easily measure noise/interference, the noise/interference can be measured through a configured null RE. In order to measure noise/interference in a CRS or CSI-RS RE, a UE preferentially recovers a CRS or a CSI-RS and subtracts a result of the recovery from a reception signal to make a noise and interference signal to be remained only. By doing so, the UE is able to obtain statistics of noise/interference from the remained noise and the interference signal. A null RE may correspond to an empty RE (i.e., transmission power is 0 (zero)) in which no signal is transmitted by a base station. The null RE makes other base stations except the corresponding base station easily measure a signal. In order to measure an amount of noise/interference, it may use all of a CRS RE, a CSI-RS RE and a null RE. Or, a base station may designate REs to be used for measuring noise/interference for a UE. This is because it is necessary to properly designate an RE to be used for measuring noise/interference measured by the UE according to whether a signal of a neighbor cell transmitted to the RE corresponds to a data signal or a control signal. Since the signal of the neighbor cell transmitted to the RE varies according to whether or not synchronization between cells is matched, a CRS configuration, a CSI-RS configuration and the like, the base station identifies the signal of the neighbor cell and may be able to designate an RE in which measurement is to be performed for the UE. In particular, the base station can designate the UE to measure noise/interference using all or a part of the CRS RE, the CSI-RS RE and the null RE.

For example, the base station may use a plurality of CSI-RS configurations and may be able to inform the UE of a CSI-RS configuration to be used for CQI feedback and a null RE position while informing the UE of one or more CSI-RS configurations. In order to distinguish the CSI-RS configuration to be used for CQI feedback by the UE from a null RE transmitted by zero transmission power, the CSI-RS configuration to be used for CQI feedback by the UE may correspond to a CSI-RS configuration transmitted by non-zero transmission power. For example, if the base station informs the UE of a CSI-RS configuration in which the UE performs channel measurement, the UE can assume that a CSI-RS is transmitted by non-zero transmission power in the CSI-RS configuration. In addition, if the base station informs the UE of a CSI-RS configuration transmitted by zero transmission power (i.e., null RE position), the UE can assume that an RE position of the CSI-RS configuration corresponds to zero transmission power. In other word, when the base station informs the UE of a CSI-RS configuration of non-zero transmission power, if there exists a CSI-RS configuration of zero transmission power, the base station can inform the UE of a corresponding null RE position.

As a modified example of the method of indicating a CSI-RS configuration, the base station informs the UE of a plurality of CSI-RS configurations and may be able to inform the UE of all or a part of CSI-RS configurations to be used for CQI feedback among a plurality of the CSI-RS configurations. Hence, having received a request for CQI feedback on a plurality of the CSI-RS configurations, the UE measures a CQI using a CSI-RS corresponding to each CSI-RS configuration and may be then able to transmit a plurality of CQI information to the base station.

Or, in order to make the UE transmit a CQI for each of a plurality of the CSI-RS configurations, the base station can designate an uplink resource, which is necessary for the UE to transmit the CQI, in advance according to each CSI-RS configuration. Information on the uplink resource designation can be provided to the UE in advance via RRC signaling.

Or, the base station can dynamically trigger the UE to transmit a CQI for each of a plurality of CSI-RS configurations to the base station. Dynamic triggering of CQI transmission can be performed via PDCCH. It may inform the UE of a CSI-RS configuration for which a CQI is to be measured via PDCCH. Having received the PDCCH, the UE can feedback a CQI measurement result measured for the CSI-RS configuration designated by the PDCCH to the base station.

A transmission timing of a CSI-RS corresponding to each of a plurality of the CSI-RS configurations can be designated to be transmitted in a different subframe or an identical subframe. If CSI-RSs according to CSI-RS configurations different from each other are designated to be transmitted in an identical subframe, it may be necessary to distinguish the CSI-RSs from each other. In order to distinguish the CSI-RSs according to the CSI-RS configurations different from each other, it may be able to differently apply at least one selected from the group consisting of a time resource, a frequency resource and a code resource of CSI-RS transmission. For example, an RE position in which a CSI-RS is transmitted can be differently designated in a subframe according to a CSI-RS configuration (e.g., a CSI-RS according to one CSI-RS configuration is designated to be transmitted in an RE position shown in FIG. 7 (a) and a CSI-RS according to another CSI-RS configuration is designated to be transmitted in an RE position shown in FIG. 7 (b)) (distinction using a time and frequency resource). Or, if CSI-RSs according to CSI-RS configurations different from each other are transmitted in an identical RE position, the CSI-RSs can be distinguished from each other by differently using a CSI-RS scrambling code in the CSI-RS configurations different from each other (distinction using a code resource).

Quasi Co-Located (QC)

A UE can receive data from a plurality of transmission points (TPs) (e.g., a TP1 and a TP2). Hence, the UE is able to transmit channel state information on a plurality of the TPs. In this case, RSs can also be transmitted to the UE from a plurality of the TPs. In this case, if it is able to share properties for channel estimation from RS ports different from each other of TPs different from each other, it may be able to reduce load and complexity of reception processing of the UE. Moreover, if it is able to share properties for channel estimation from RS ports different from each other of an identical TP between the RS ports, it may be able to reduce load and complexity of reception processing of the UE. Hence, LTE-A system proposes a method of sharing properties for channel estimation between RS ports.

For channel estimation between RS ports, LTE-A system has introduced such a concept as "quasi co-located (QLC)". For example, if two antenna ports are quasi co-located (QC), the UE may assume that large-scale properties of the signal received from the first antenna port can be inferred from the signal received from the other antenna port". In this case, the large-scale properties can include at least one selected from the group consisting of delay spread, Doppler spread, Doppler shift, average gain and average delay. In the following, the quasi co-located is simply referred to as QCL.

In particular, if two antenna ports are QCL, it may indicate that large-scale properties of a radio channel received from one antenna port are identical to large-scale properties of a radio channel received from another antenna port. If antenna ports transmitting RSs different from each other are QCL, large-scale properties of a radio channel received from one antenna port of a type can be replaced with large-scale properties of a radio channel received from one antenna port of a different type.

According to the aforementioned QCL concept, a UE is unable to assume large-scale channel properties identical to each other between radio channels received from non-QCL (NQC) antenna ports. In particular, in this case, a UE should perform an independent processing according to each configured non-QCL antenna port to obtain timing acquisition and tracking, frequency offset estimation and compensation, delay estimation, and Doppler estimation and the like.

A UE can perform operations in the following between antenna ports capable of assuming QCL. First of all, the UE can use delay spread, Doppler spectrum, Doppler spread estimation result for a radio channel received from an antenna port when a channel is estimated for a radio channel received from a different antenna port. Secondly, regarding frequency shift and received timing, after time synchronization and frequency synchronization for a single antenna port are performed, the UE can apply identical synchronization to demodulation of a different antenna port. Thirdly, regarding average received power, the UE can average RSRP (reference signal received power) measurements for over two or more antenna ports.

If a UE receives a DMRS-based DL-related DCI format via a control channel (PDCCH or EPDCCH), the UE performs channel estimation for a corresponding PDSCH via a DM-RS sequence and performs data demodulation. If DMRS port configuration received from a DL scheduling grant is capable of being QCL with a CRS port, the UE can apply the large-scale channel properties estimation estimated from the CRS port as it is in case of estimating a channel via the DMRS port. This is because a CRS corresponds to a reference signal broadcasted in every subframe with relatively high density over a whole band, the estimation on the large-scale channel properties can be more stably obtained from the CRS. On the contrary, since a DMRS is UE-specifically transmitted for a specific scheduled RB and a precoding matrix, which is used by a base station for transmission, may vary according to a PRG unit, an effective channel received by the UE may vary according to the PRG unit. Hence, if a DMRS is used for estimating the large-scale channel properties of a radio channel over a wide band, performance degradation may occur. In case of a CSI-RS, since the CSI-RS has a relatively long transmission period and a relatively low density, if the CSI-RS is used for estimating the large-scale channel properties of the radio channel, performance degradation may occur.

Figure 11:
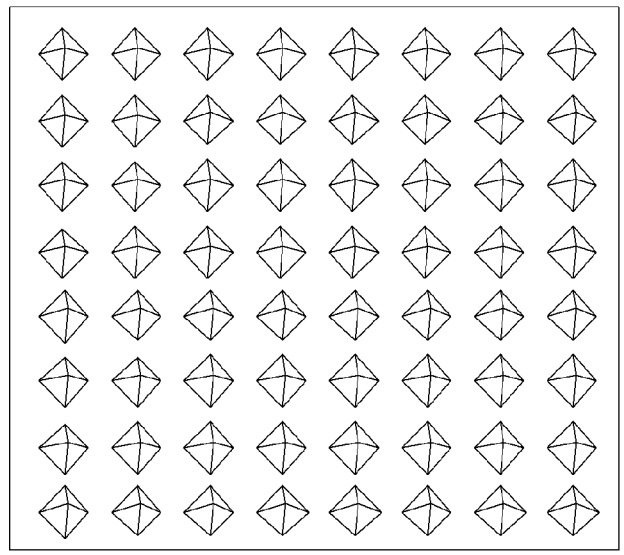
FIG. 11 is a diagram for an active antenna system (AAS)

FIG. 11 illustrates an active antenna system (AAS);

In a wireless communication system after LTE Rel-12, the introduction of an antenna system utilizing AAS has been discussed. Since each antenna in the AAS corresponds to an active antenna including an active circuit, an antenna pattern can be changed in order to adapt to a wireless communication environment. Thus, in the AAS, interference can be reduced and efficient beamforming can also be performed.

Moreover, if the AAS is established in two dimensions (i.e., 2D-AAS), it is possible to adjust a beam direction at a main lobe of each antenna not only in the horizontal direction but also in the vertical direction in terms of the antenna pattern. Thus, the beam adaptation can be performed more efficiently in three dimensions. In addition, it is possible to actively change a transmitted beam depending on a location of a UE based on the above beam adaptation. That is, the 2D-AAS may mean an antenna system having multiple antennas where the multiple antennas are installed in the vertical and horizontal directions.

When the above-mentioned 2D-ASS is introduced, a large number of antennas may be installed in a vertical antenna domain and thus the number of antennas is remarkably increased. To efficiently manage such a large number of the antennas, reference signal (RS) design for measuring a channel at each antenna and feedback design for a UE to provide feedback of channel information between each antenna and the UE becomes very important. The reason for this is that as the number of antennas increases, an RS overhead and a feedback overhead increases either linearly or exponentially in general.

In the current LTE system, REs (resource elements) amounting to the number of antenna ports are assigned for a CSI-RS in each PRB (physical resource block) pair. If 64 antennas are used as shown in FIG. 11 and a reference signal is designed similar to that of the current LTE system, 64 resource elements need to be assigned for the CSI-RS in each PRB pair. In addition, in the case of the normal CP (cyclic prefix), considering that 168 resource elements are present in the PRB pair, too many resource elements are used for the CSI-RS. Moreover, in this case, resource elements that can be used for transmitting actual data are significantly insufficient in consideration of control channels and other reference signals.

To solve such an overhead problem due to the CSI-RS, methods for reducing a reference signal overhead by transmitting reference signals only through some antenna ports have been proposed. For instance, reference signal design that uses the Kronecker product has been proposed. According to the reference signal design, in the case of an antenna arrangement with 8 rows and 8 columns shown in FIG. 11, reference signals are transmitted only through antennas included in a single row and antennas included in a single column After receiving the reference signals, a UE performs the Kronecker product on channels for the antennas in the row and column based on the received reference signals. Thereafter, the UE may restore channels for the remaining antennas that are not used for transmitting the reference signals. Further, instead of the Kronecker product, the UE may use a different method to estimate channel states of the remaining antennas based on the received reference signals with respect to some antennas.

Figure 12:
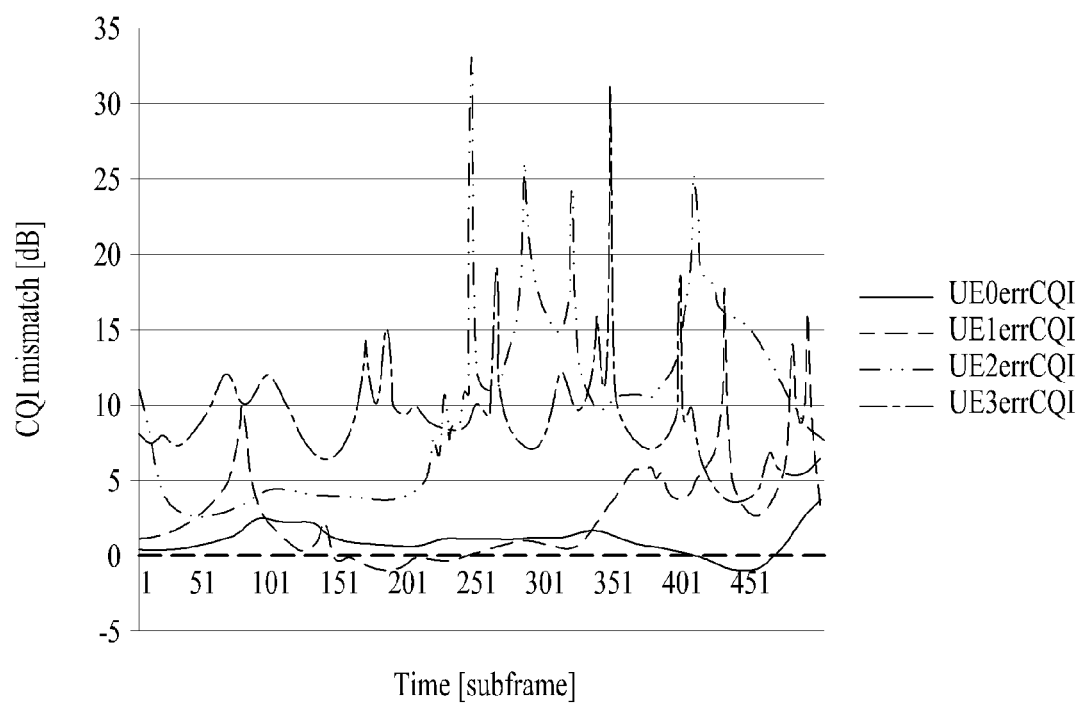
FIG. 12 illustrates a CQI-mismatch in the related art.

When the channel states of the remaining antennas are estimated or restored from the reference signals with respect to some antennas as described above, the channel estimation may be performed inaccurately. In addition, the inaccurate channel estimation may cause a UE to transmit an inaccurate CQI (channel quality indicator) to a base station. FIG. 12 illustrates a CQI-mismatch in the related art. The graph in FIG. 12 shows differences between channel qualities of individual channels when a PMI (precoding matrix indicator) obtained from a channel restored using the Kronecker product is applied to the actual channel and the channel based on the Kronecker product.

FIG. 12 shows the CQI measurement performed by four UEs during 1000 subframes. Referring to FIG. 12, the CQI mismatch is represented as a CQI error (dB) and the CQI mismatch between the channel restored by the Kronecker product and the actual channel reaches a high level. For instance, the CQI mismatch measured in a first UE (UE1) exceeds 30 dB. Such a CQI mismatch may have an effect when the base station determines scheduling and an MCS (modulation and coding scheme) level. Thus, the CQI mismatch may cause overall performance degradation in the communication system.

Thus, when all antenna channels are restored from the reference signals for some antennas as described above, a method for preventing the CQI mismatch is required. Hereinafter, embodiments for preventing the CQI mismatch will be described based on the above discussion.

Embodiment 1

A new reference signal can be used to reduce the aforementioned CQI mismatch. For instance, the CQI mismatch may be corrected by designing the new reference signal. First of all, a base station may receive a CSI (channel state information) report from a UE. In this case, the CSI report transmitted from the UE may be state information on all channels restored from the reference signals for some antennas. After receiving the CSI report, the base station may select a rank and a precoding to be transmitted to the UE in consideration of a PMI (precoding matrix indicator) and an RI (rank indicator) of the CSI. Thereafter, the base station may generate ports as many as the selected rank by applying the selected precoding and then transmit new reference signals through the generated ports. The new reference signal according to the present invention may correspond to a reference signal used in the wireless communication system supporting the 2D-AAS composed of multiple vertical antennas and multiple horizontal antennas and it can be defined to reduce the CQI mismatch. For example, the new reference signal according to the present invention can be defined to prevent CQI mismatches at selected ports. Here, ports may mean identification numbers of antennas or a logical or physical group of antennas. For instance, the selected ports may mean horizontal antenna ports included in one row or vertical antenna ports included in one column. In addition, the selected ports may indicate at least one horizontal antenna port and at least one vertical antenna port included in a prescribed region.

When transmitting the new reference signals, the base station may inform the UE of the number of ports through which the new reference signals are transmitted (e.g., a value equal to the rank currently selected by the base station). In addition, the base station may inform the UE of which CSI-RSs are associated to the new reference signals. For instance, the base station may inform the UE of the CSI-RSs associated with the new reference signals by using a scheme of informing a QCL (quasi co-located) CSI-RS identifier through PQI (PDSCH resource element mapping and quasi co-location indicator) of the current LTE system. The UE may calculate the CQI using the received new reference signals and then feedback the calculated CQI value to the base station. In addition, instead of informing the associated CSI-RSs and the selected rank, the base station may inform the UE of an MCS level and the rank using DCI (downlink control information). In this case, the base station may not transmit separate data using the DCI.

The CQI value calculated from the above-described new reference signals may be transmitted through an existing CSI feedback procedure designed in the LTE system. Alternatively, the CQI value may be transmitted to the base station through a new feedback procedure for CQI transmission. The UE may report the CQI value calculated from the new reference signals to the base station. Moreover, the UE may report a difference between the CQI value calculated from the new reference signals and a CQI value calculated from the associated CSI-RSs. Furthermore, the new reference signal may be configured to have a longer period than the CSI-RS associated with the new reference signal.

Additionally, when the CQI feedback for correcting the CQI mismatch overlaps with the conventional PMI/CQI feedback in the same subframe, the UE may provide only the CQI feedback for correcting the CQI mismatch. Further, when the CQI feedback for correcting the CQI mismatch overlaps with the conventional PMI/CQI feedback in the same subframe, the UE may encode the CQI feedback for correcting the CQI mismatch together with the conventional PMI/CQI feedback and then provide the encoded feedback. When the CQI mismatch is corrected using the new reference signals as described above, the base station may instruct, by using DCI for uplink, the UE whether to report the CQI calculated from the new reference signals.

Embodiment 2

The CQI mismatch can be corrected using a DM-RS (demodulation reference signal) currently used in the LTE system, instead of the new reference signal. Description overlapping with the embodiment 1 will be omitted in the following. For instance, after receiving the CSI report, the base station may select the rank and the precoding to be transmitted to the UE based on the PMI (precoding matrix indicator) and the RI (rank indicator) of the CSI. Thereafter, the base station may generate ports as many as the selected rank by applying the selected precoding and then transmit the DM-RS and a PDSCH through the generated ports. The UE may obtain RI (rank indicator) information and an MCS (modulation and coding scheme) level for the corresponding UE based on DCI (downlink control information). Thus, in this case, the base station does not need to inform the UE of the associated CSI-RS. After recalculating the CQI using the DM-RS, the UE may feedback the recalculated CQI value to the base station.

As mentioned in the foregoing description, the CQI value may be transmitted through the existing CSI feedback procedure used in the LTE system. However, a new feedback procedure may be used for CQI feedback. In this case, the UE may report the CQI value recalculated using the DM-RS to the base station. Moreover, the UE may report differences between the CQI value and/or the MCS (modulation and coding scheme) level recalculated using the DM-RS and the CQI value and/or the MCS level included in the CSI report.

When the CQI mismatch is corrected using the DM-RS, the base station may instruct, by using DCI associated with the PDSCH transmitted together with the DM-RS, the UE whether to report the CQI based on the DM-RS. In addition, if the base station instructs, by using DCI for downlink, the UE whether to report the CQI, the UE may not receive a resource and an MCS level for the CQI feedback. In this case, the UE may use the most recent uplink DCI to provide the CQI feedback.

Embodiment 3

The CQI value can be calculated using the CSI-RS. In other words, the CQI mismatch can be corrected using the CSI-RS used in the current LTE system. Description overlapping with the embodiments 1 and 2 will be omitted in the following. For instance, after receiving the CSI report from the UE, the base station may select the rank and the precoding to be transmitted to the UE based on the PMI (precoding matrix indicator) and the RI (rank indicator) of the received CSI. Thereafter, the base station may generate ports as many as the selected rank by applying the selected precoding and then transmit the CSI-RS for correcting the CQI mismatch to the UE through the generated ports. In this case, the base station may inform the UE of which CSI-RS is associated with the CSI-RS for correcting the CQI mismatch. In addition, when the CSI-RS for correcting the CQI mismatch is configured, the base station may inform the UE of information on the previous CQI.

After recalculating the CQI using the newly configured CSI-RS for correcting the CQI mismatch, the UE may feedback the recalculated CQI value to the base station. The CQI value may be transmitted through the existing CSI feedback procedure used in the LTE system. However, the recalculated CQI value may be transmitted through a newly designed feedback procedure. In this case, the UE may report, to the base station, the CQI value calculated using the CSI-RS for correcting the CQI mismatch or a difference between the CQI value calculated using the CSI-RS for correcting the CQI mismatch and a CQI value calculated using the associated CSI-RS. Moreover, the CSI-RS for correcting the CQI mismatch may be configured to have a longer period than the associated CSI-RS. Furthermore, the base station may instruct, by using the DCI for uplink, the UE whether to report the CQI calculated using the CSI-RS for correcting the CQI mismatch to the base station.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other network nodes except the eNode B. 'Base station (BS)' may be substituted with such a terminology as a fixed station, a Node B, an eNode B (eNB), an access point (AP) and the like.

Embodiments of the present invention may be implemented using various means. For instance, embodiments of the present invention may be implemented using hardware, firmware, software and/or any combinations thereof. In case of the implementation by hardware, one embodiment of the present invention may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then drivable by a processor. The memory unit is located at the interior or exterior of the processor and may transmit and receive data to and from the processor via various known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The above-described embodiments of the present invention can be applied to various mobile communication systems.

What is claimed is:

1. A method of measuring channel quality by a base station (BS) equipped with a two-dimensional active antenna system including a plurality of antennas, the method comprising:
- transmitting, to a user equipment (UE), a plurality of channel state information-reference signals (CSI-RSs);
- receiving, from the UE, first channel state information (CSI) for the plurality of antennas,
- wherein the first CSI is generated based on a first one of the CSI-RSs for a subset of the plurality of the antennas and wherein the first CSI includes a precoding matrix indicator (PMI), a rank indicator (RI) and a first channel quality indicator (CQI);
- generating a port based on a precoding and a rank,
- wherein the precoding and the rank are selected based on the PMI and the RI;
- transmitting, to the UE, downlink control information (DCI) informing the UE whether feedback for a second CQI is reported,
- transmitting, to the UE, a second RS and a physical downlink shared channel (PDSCH) via the port; and
- receiving, from the UE, the feedback for the second CQI for reducing a mismatch of the first CQI,
- wherein resources for the feedback for the second CQI and Modulation and Coding Scheme (MCS) are not indicated by the DCI,
- wherein an identifier on a specific CSI-RS related to the second CQI among the plurality of CSI-RSs is received by the UE, the specific CSI-RS is Quasi co-Located (QCL) with the second RS based on PDSCH resource element mapping and Quasi co-location Indicator (PQI),
- wherein the second CQI is generated based on the second RS, and
- wherein the feedback includes a difference value between the first CQI and the second CQI.

2. A method of measuring channel quality by a user equipment (UE) in a wireless communication system supporting a two-dimensional active antenna system including a plurality of antennas, the method comprising:
- receiving, from a base station (BS), a plurality of channel state information-reference signals (CSI-RSs) for a subset of the plurality of antennas;
- generating CSI (channel state information) on the plurality of antennas based on the plurality of CSI-RSs;
- transmitting, to the BS, the CSI,
- wherein the CSI includes a precoding matrix indicator (PMI), a rank indicator (RI) and a first channel quality indicator (CQI);
- receiving, from the BS, downlink control information (DCI) informing the UE whether feedback for a second CQI is reported,
- receiving, from the BS, a second RS and a physical downlink shared channel (PDSCH) via a port generated based on a precoding and a rank,
- wherein the precoding and the rank are selected based on the CSI;
- generating the feedback for the second CQI for reducing a mismatch of the first CQI based on the second RS; and
- reporting, to the BS, the feedback,
- wherein resources for the feedback for the second CQI and Modulation and Coding Scheme (MCS) are not indicated by the DCI,
- wherein an identifier on a specific CSI-RS related to the second CQI among the plurality of CSI-RSs is received by the UE, the specific CSI-RS is Quasi co-Located (QCL) with the second RS based on PDSCH resource element mapping and Quasi co-location Indicator (PQI), and
- wherein the feedback includes a difference value between the first CQI and the second CQI.

* * * * *